US010814258B2

(12) United States Patent
Shim et al.

(10) Patent No.: US 10,814,258 B2
(45) Date of Patent: Oct. 27, 2020

(54) FILTER MEDIUM HAVING EXCELLENT HEAT RESISTANCE

(71) Applicant: AHLSTROM-MUNKSJÖ OYJ, Helsinki (FI)

(72) Inventors: Jesse Shim, Daegu (KR); Kevin Kim, Daegu (KR); Ryan Kwon, Daegu (KR); Jayden Bae, Daegu (KR); Jamie Byeon, Daegu (KR)

(73) Assignee: Ahlstrom-Munksjö Oyj, Helsinki (FI)

( * ) Notice: Subject to any disclaimer, the term of this patent is extended or adjusted under 35 U.S.C. 154(b) by 59 days.

(21) Appl. No.: 15/763,893

(22) PCT Filed: Oct. 4, 2016

(86) PCT No.: PCT/EP2016/073669
§ 371 (c)(1),
(2) Date: Mar. 28, 2018

(87) PCT Pub. No.: WO2017/055638
PCT Pub. Date: Apr. 6, 2017

(65) Prior Publication Data
US 2018/0280844 A1 Oct. 4, 2018

(30) Foreign Application Priority Data

Oct. 2, 2015 (DE) .................... 20 2015 105 210 U

(51) Int. Cl.
*B01D 29/07* (2006.01)
*B01D 39/16* (2006.01)
(Continued)

(52) U.S. Cl.
CPC .......... *B01D 39/163* (2013.01); *B01D 29/07* (2013.01); *B01D 35/005* (2013.01); *D21F 11/145* (2013.01); *D21H 13/24* (2013.01); *B01D 2239/0216* (2013.01); *B01D 2239/064* (2013.01); *B01D 2239/0636* (2013.01); *B01D 2239/0654* (2013.01); *B01D 2239/086* (2013.01); *B01D 2239/10* (2013.01);
(Continued)

(58) Field of Classification Search
CPC .... B01D 39/163; B01D 29/07; B01D 35/005; D21F 11/145; D21H 13/24
See application file for complete search history.

(56) References Cited

U.S. PATENT DOCUMENTS 3,231,642 A * 1/1966 Goldman ................ B29C 48/03
264/567
3,231,653 A * 1/1966 Goldman ................ B29C 48/03
264/567
(Continued)

FOREIGN PATENT DOCUMENTS

CN 101151406 A 3/2008

OTHER PUBLICATIONS

International Search Report for PCT/EP2016/073669, dated Jan. 4, 2017, 3 pages.
(Continued)

*Primary Examiner* — Chester T Barry
(74) *Attorney, Agent, or Firm* — Edwin A. Sisson, Attorney at Law, LLC; Jeffrey J. Banyas

(57) ABSTRACT

The present invention relates to a filter medium having improved heat resistance and filtration efficiency.

28 Claims, 4 Drawing Sheets

(51) Int. Cl.
    *B01D 35/00*     (2006.01)
    *D21F 11/14*     (2006.01)
    *D21H 13/24*     (2006.01)

(52) U.S. Cl.
    CPC ............ *B01D 2239/1216* (2013.01); *B01D 2239/1225* (2013.01); *B01D 2239/1233* (2013.01); *B01D 2239/1258* (2013.01); *B01D 2239/1275* (2013.01)

(56) References Cited

U.S. PATENT DOCUMENTS

| | | | | |
|---|---|---|---|---|
| 3,346,388 | A * | 10/1967 | Andrews | B65D 85/808 426/82 |
| 4,551,378 | A * | 11/1985 | Carey, Jr. | D04H 1/06 156/308.2 |
| 4,830,904 | A * | 5/1989 | Gessner | D04H 1/54 206/524.1 |
| 6,090,731 | A * | 7/2000 | Pike | B01D 39/163 442/409 |
| 6,808,691 | B1 * | 10/2004 | Herve | A61L 2/26 206/363 |
| 10,178,866 | B2 * | 1/2019 | Worley | D06M 23/10 |
| 2006/0096263 | A1 | 5/2006 | Kahlbaugh et al. | |
| 2012/0129032 | A1 * | 5/2012 | Greiner | D01F 8/14 429/144 |
| 2012/0180968 | A1 * | 7/2012 | Gupta | D21H 13/24 162/157.3 |
| 2014/0197094 | A1 | 7/2014 | Rogers et al. | |
| 2014/0224727 | A1 | 8/2014 | Yu et al. | |
| 2016/0176172 | A1 * | 6/2016 | Miyahara | D04H 1/593 156/308.2 |
| 2019/0160199 | A1 * | 5/2019 | Worley | A61L 15/44 |

OTHER PUBLICATIONS

Written Opinion of the ISA for PCT/EP2016/073669, dated Jan. 4, 2017, 6 pages.

Xu, Yan, "First Notification of Office Action for Chinese Application No. 201680057323.1", dated Dec. 26, 2019, China National Intellectual Property Administration.

* cited by examiner

FILTER MEDIUM HAVING EXCELLENT HEAT RESISTANCE

This application is the U.S. national phase of International Application No. PCT/EP2016/073669 filed 4 Oct. 2016, which designated the U.S. and claims priority to DE Patent Application No. 20 2015 105 210.3 filed 2 Oct. 2015, the entire contents of each of which are hereby incorporated by reference.

TECHNICAL FIELD OF THE INVENTION

The present invention relates to a filter medium having improved heat resistance and filtration efficiency which can be used as oil filter in combustion engines of automobiles, where temperatures usually are from 100° C. to 150° C.

GENERAL PRIOR ART

Filter media for e.g. combustion engines in automobiles have been commonly known for years and described in detail in technical literature. Since combustion engines are lubricated using oil, these filter media typically filter out portions of the oil which have been thermally decomposed inside the engine, metal abrasion and other pollutants (e.g. soot) so that lubrication of the combustion engine is maintained. Typically, synthetic fibers in these filter media are impregnated with binding resins or glued with low melting binder fibers in order to provide the high temperature burst strength necessary for filtering oil.

One drawback of such filter media is that the these known binder resins or binder fibers are typically low melting and can thus already melt at the high temperatures prevalent in combustion engines which are in the ranges from 100 to 150° C., particularly from 140 to 150° C. These molten components can clog the pores of the filter which, in turn, results in a decrease in filtering performance and, in the end, may considerably reduce the life of the filter due to a lower burst strength. Replacement of such clogged filter will then be inevitable even before the common service intervals. In order to avoid this problem, the filter media are typically enlarged in diameter which, however, results in higher material costs for both the filter medium as such and the necessary connections inside the combustion engine.

Another drawback of known filter media for low temperature applications is that due to their low heat resistance they can deform and shrink at the temperatures prevalent in combustion engines, which reduces burst resistance of the filter medium and again results in a shortened life of the filter. Moreover, supporting wire meshes are frequently utilised in conventional filter media so as to be able to ensure the pleated structure of the filter media to increase the filter surface. This is necessary since most of the filter media cannot maintain the pleated structure of their own accord, particularly under high temperatures such as in a combustion engine.

Known filter media for normal or hot gases are commonly not suitable for high temperature liquid filtration applications because these known filter media cannot withstand the higher forces which liquids exert on the filter media.

OBJECT OF THE PRESENT INVENTION

The present inventors recognized the above drawbacks and the associated objective technical problem of providing a filter medium which is particularly suitable for hot liquid filtration applications by having mechanical and chemical properties which do not change under such high temperatures and/or high forces exerted by liquids on the filter medium. The objective forming the basis of the present invention is therefore to provide an improved filter medium for high temperature liquid filtration applications such as oil filtration in automobiles. Against this background, the present invention proposes a filter medium according to claim 1 in order to solve the problems of known filter media described above.

In particular, a filter medium is provided which has improved heat resistance at least up to 150° C. and, consequently, is characterized by lower deformation and shrinkage, higher burst resistance and improved filtering efficiency at these temperatures.

Further, the filter medium according to the invention is easy to handle and ideally maintains its pleated structure after pleating.

SUMMARY OF THE INVENTION

The present invention relates to a filter medium according to the claims. Moreover, a filter element comprising the filter medium according to the invention and a process for preparing the inventive filter medium are provided.

The filter medium according to the invention is particularly suitable for improved filtering of hot liquids like oil in combustion engines.

GENERAL DEFINITIONS

Figure 1:
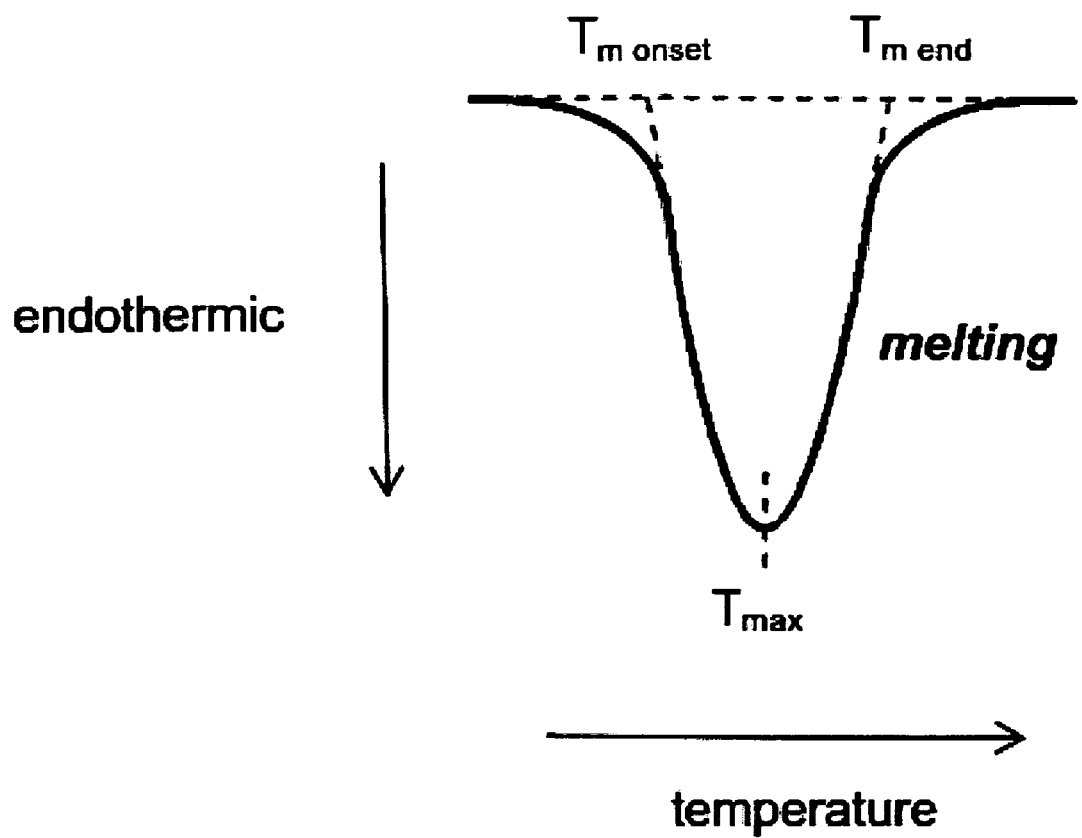
FIG. 1 shows a schematic representation of the relevant temperature characteristics which may be determined using DSC measurements.

The term "comprising" as used in the description and the claims means "consisting at least in part of". When interpreting statements in this description and the claims which include the term "comprising", other features besides the features prefaced by this term in each statement can be present. Related terms such as "comprise", "comprises" or "comprised" are to be interpreted in a similar manner.

The term "consisting of" has the meaning that other features besides the features prefaced by this term in each statement are not present.

It is an additional or alternative object of at least preferred embodiments of the present invention to provide the public with a useful choice.

In this description where reference has been made to patents, other external documents, or other sources of information, this is generally for the purpose of providing a context for discussing the features of the invention. Unless specifically stated otherwise, reference to such external documents or sources of information is not to be construed as an admission that such documents or such sources of information, in any jurisdiction, are prior art of the common general knowledge in the art.

The features recited in depending claims or preferred embodiments are freely combinable unless otherwise explicitly stated.

Furthermore, it is to be understood that the use of "a" or "an", i.e. a singular form, used herein does not exclude the plural form.

Each numerical value or range disclosed herein means that it may be modified by +/−10%. As regards endpoints of ranges, this means that the lower endpoint may be reduced by 10% and the upper endpoint may be increased by 10%.

DETAILED DESCRIPTION OF THE INVENTION

According to the invention, the problem described above is solved by a filter medium comprising, or consisting of, at least one wet-laid fiber layer. This fiber layer is characterized in that it comprises, or consists of, two fiber components: (i) synthetic polymer fibers having a melting point of greater than 155° C. and (ii) binder fibers having a core-sheath structure. The binder fibers are characterized in that the core of the binder fibers comprises, or consists of, a core polymer material and this core is at least partially, preferably completely, surrounded by a sheath polymer material constituting the sheath of the binder fibers. Both the core polymer material and the sheath polymer material have a melting point of greater than 155° C., wherein the melting point of the sheath polymer material is lower than the melting point of the core polymer material. The mean pore size of the wet-laid fiber layer is preferably more than 20 μm, more preferably in the range of 20 μm to 200 μm, even more preferably in the range of 30 μm to 150 μm, most preferably in the range of 35 μm to 125 μm.

In the following, the components of the filter medium according to the invention, the filter element according to the invention and the process for preparing the inventive filter medium are described in detail.

Filter Medium

The filter medium according to the invention comprises, or consists of, at least one wet-laid fiber layer. Additional fiber layers may be optionally applied. A "nonwoven" is a fabric completely, or at least to a considerable part, consisting of fibers, wherein, according to the invention, these fibers can be the fibers described below and having a slenderness ratio (ratio of fiber length in mm to fiber diameter in mm) of at least 150.

The fiber layer is characterized in that it comprises, or consists of, two fiber components: (1) synthetic polymer fibers and (2) binder fibers. Preferably, the fiber layer exclusively consists of synthetic fibers and binder fibers. Preferably, the fiber layer exclusively consists of non-fibrillated synthetic fibers and binder fibers. Alternatively, the at least one wet-laid fiber layer (or wet-laid non-woven) may comprise a binder resin such as a phenolic resin, an acrylic resin, a melamine resin, a silicone resin, a fluorocarbon resin/fluoropolymer, an epoxy resin and/or mixtures thereof. If present, the at least one wet-laid fiber layer may be coated or impregnated/saturated with the binder resin. In some embodiments, the binder resin may have a concentration of from 10-30% by weight, preferably 15-23% by weight, of the wet-laid fiber layer.

The wet-laid fiber layer may optionally include at least one additive which is common in the art.

In the following, the synthetic polymer fibers and the binder fibers are described in detail.

Synthetic Polymer Fibers

The synthetic polymer fibers principally have a melting point greater than 155° C., preferably greater than 180° C., more preferably greater than 200° C., most preferably greater than 230° C.

As used herein, the term "melting point" refers to the endothermic maximal peak temperature $T_{max}$ as determined using differential scanning calorimetry (DSC) measurements (see also FIG. 1). The melting point and all other temperature characteristics which are measured using DSC are preferably determined under the DSC conditions, as described in the Example.

The term "synthetic fibers" as used herein is used to delineate from natural fibers obtainable from material of natural sources. Synthetic fibers therefore comprise polymeric material, synthesized by polymerization of monomeric entities, fibers obtained by regeneration of natural fibers, for instance after dissolution in a solvent, and (micro-)glass fibers.

The term "fibers" (or "staple fibers") as used herein is used to delineate from filaments, i.e. fibers having an average fiber length of more than 45 mm.

Suitable synthetic polymer fibers for use in the present invention are preferably selected from the following list polyesters (such as polyalkylene terephthalates like polyethylene terephthalate (PET), polybutylene terephthalate (PET), etc.); polyalkylenes (such as polyethylene, polypropylene, etc.); polyacrylonitriles (PAN); polyamides (nylon such as nylon-6, nylon-6.6, nylon-6.12, etc.); and/or mixtures thereof. In a preferred embodiment, the synthetic fibers comprise, or consist of, a thermoplastic polymer or a mixture of thermoplastic polymers. The synthetic fibers more preferably comprise, or consist of, polyethylene terephthalate (PET).

Preferably, the synthetic fibers are staple fibers.

The amount of the synthetic polymer fibers may be, in one embodiment, in the range of 10 to 50 wt.-%, preferably 20 to 40 wt.-%, more preferably 25 to 35 wt.-%, based on the total amount of fibers in the at least one fiber layer. Alternatively, the amount of the synthetic polymer fibers may be in the range of 10 to 90 wt.-%, preferably 30 to 80 wt.-%, such as 30, 40, 50, 60, 70 or 80 wt.-%, based on the total amount of fibers in the at least one fiber layer.

The synthetic polymer fibers have an average fiber length in the range of 3 to 15 mm such as 3 to 7 mm, preferably 4 to 6 mm. The average fiber length is determined using microscope analysis (microscope model: NIKON ECLIPSE ME600; magnification: 100×). The synthetic polymer fibers have an average fiber diameter in the range of 3.3 to 10 μm, preferably 4.5 to 6.5 μm, as determined using microscope analysis (microscope model: NIKON ECLIPSE ME600; magnification: 100×).

Further, the synthetic polymer fibers have a linear mass density in the range of 0.1 to 1.0 g/9000 m, preferably 0.2 to 0.6 g/9000 m, as determined by ASTM D 1577.

Binder Fibers

Binder fibers, in particular bicomponent binder fibers, are used for bonding the fibers of the at least one fiber layer of the filter medium according to the present invention. These binder fibers comprise a thermoplastic core polymer material surrounded at least partially, preferably completely, by a meltable surface layer of a thermoplastic sheath polymer material having a lower melting point than the core polymer material.

As used herein, the term "binder fibers" should be understood as fibers having a core-sheath structure and preferably having a lower melting point than the synthetic fibers in the filter medium, wherein the binder fibers act as a binder under heat and/or pressure. This is achieved by at least partial melting of the sheath polymer material as a thermally binding component under heat and/or pressure, thereby binding the synthetic polymer fibers and core polymer material of the binder fibers as matrix fibers.

According to the invention, the melting point of the binder fibers, i.e. of the sheath and core polymer materials, is greater than 155° C., wherein the melting point of the sheath polymer material is lower than the melting point of the core polymer material. This difference is preferably more than 20° C., particularly more than 50° C. or more than 75° C. The term "melting point" refers to the endothermic maximal peak temperature $T_{max}$ as discussed above (see FIG. 1).

In a preferred embodiment, the melting point of the core polymer material is greater than 200° C., preferably greater than 230° C., more preferably greater than 250° C. Particularly, the melting point, i.e. the peak temperature $T_{max}$, of the core polymer material is preferably 257° C. as determined using DSC measurements. The DSC measurements are preferably performed using the DSC conditions as described in the examples.

In a preferred embodiment, the melting point of the sheath polymer material is at least 155° C., preferably at least 160° C., more preferably at least 165° C., such as in the range of 155° C. to 180° C., preferably 160° C. to 170° C.

The onset temperature $T_{m\ Onset}$ of the melting of the sheath polymer material is preferably at least 130° C., more preferably at least 135° C. as determined using DSC. As commonly described (see e.g. ISO 11357-3:1999(E)), the term "onset temperature of the melting $T_{m\ Onset}$" refers to the temperature at which the reversal point of the curve for the onset of the melting cuts the extrapolated baseline of the melting transition curve as measured using DSC (see FIG. 1). The onset temperature $T_{m\ onset}$ of the melting and all other temperature characteristics which are measured using DSC are preferably determined under the DSC conditions, as described in the examples.

The end temperature $T_{m\ end}$ of the melting of the sheath polymer material is preferably at least 160° C., preferably at least 170° C., more preferably at least 180° C. as determined using DSC measurements. As commonly described (see e.g. ISO 11357-3:1999(E)), the term "end temperature of the melting $T_m$ end" refers to the temperature at which the reversal point of the curve for the end of the melting cuts the extrapolated baseline of the melting transition curve as measured using DSC (see FIG. 1). The end temperature of the melting $T_{m\ end}$ is preferably determined under the DSC conditions, as described in the examples.

Preferably, the sheath polymer material is characterized by having a degree of crystallization in the range of 20 to 80%, preferably more than 25% such as 25 to 60% or e.g. 30 to 50% as determined by X-ray diffraction (see European Pharmacopoeia, 8$^{th}$ edition, 2014, chapter 2.9.33: "Characterization of crystalline and semi-crystalline solids using XRPD"). The term "degree of crystallization" (or "crystallinity" or "crystallinity degree") refers to the crystalline portion of the semi-crystalline polymer of the binder fibers.

According to the invention, the difference between the onset temperature of the melting $T_{m\ onset}$ and the end temperature of the melting $T_{m\ end}$ of the sheath polymer material is preferably at least 30° C., more preferably at least 35° C., most preferably at least 40° C., 45° C., 50° C. or 60° C. This difference relates to the melting range (also "melting interval") of the sheath polymer material and is, on the one hand, characterized by the onset temperature of the melting $T_{m\ onset}$ as defined above and, on the other hand, by the end temperature of the melting $T_{m\ end}$ (see FIG. 1).

Figure 4:
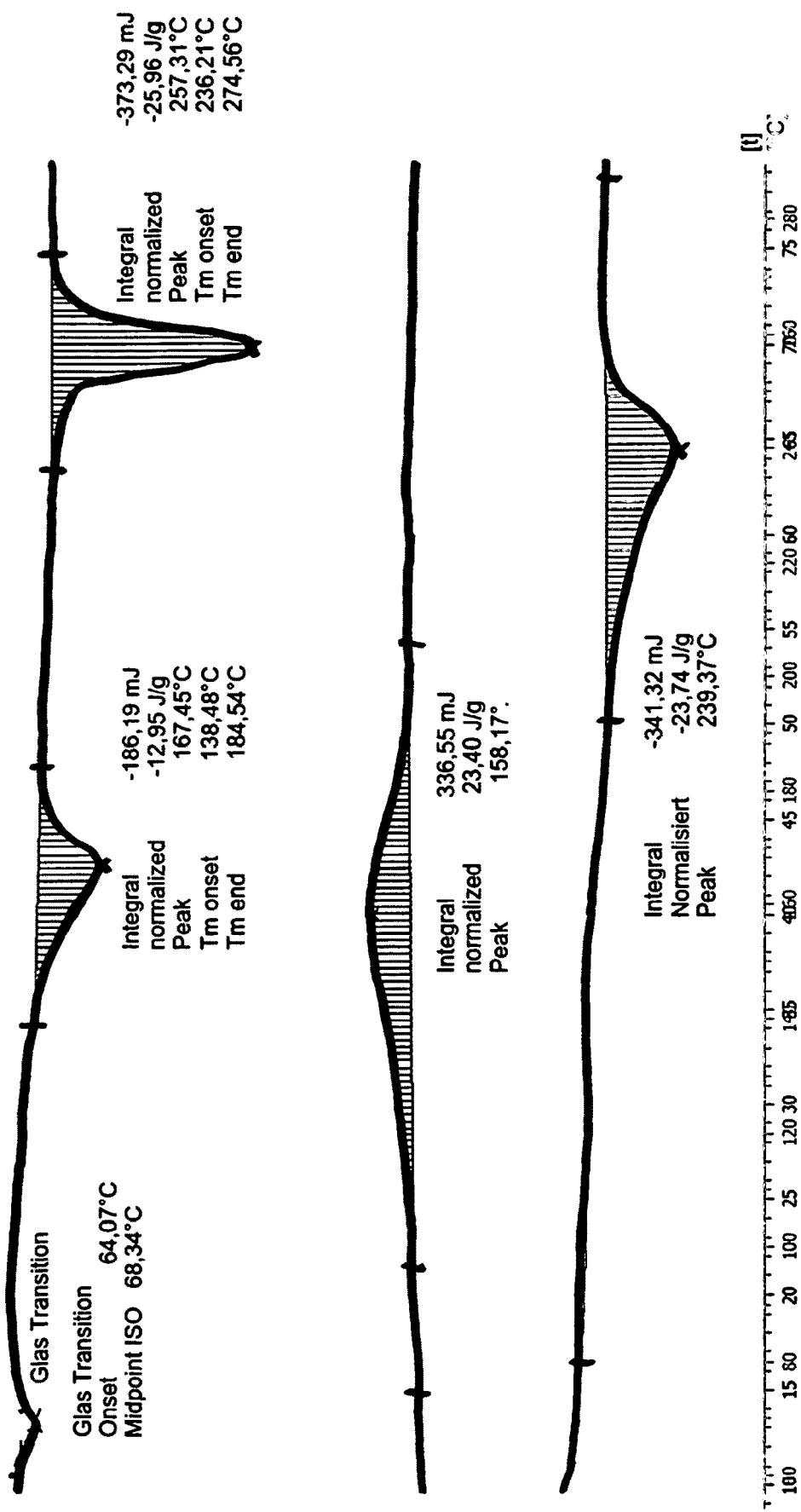
FIG. 4 shows the results of DSC measurements obtained from a binder fiber having a core-sheath structure (1. heat run: upper graph; 1. cool run: middle graph; 2. heat run: lower graph; DSC measurements were carried out as described in Example 1).

Accordingly, the binder fibers show two endothermic DSC peaks due to their core-sheath structure, wherein these peaks may be assigned to the core polymer material and the sheath polymer material (see e.g. FIG. 4). These two peaks are preferably characterized by the temperature characteristics $T_{max}$, $T_{m\ onset}$ and $T_{m\ end}$ for the core- and sheath polymer materials as defined and specified above.

Preferably, the filter medium according to the invention does not comprise binder fibers which are completely amorphous in their sheath part.

The crystallization temperature of the binder fibers having a core-sheath structure as determined using DSC is, in a preferred embodiment, in the range of 140-188° C. such as 160° C. The "crystallization temperature" refers to the exothermic maximal peak temperature as determined using DSC.

The glass transition temperature $T_g$ of the binder fibers is preferably at least 50° C., more preferably at least 55° C. or 60° C. as determined using DSC. The "glass transition temperature" refers to the temperature at which the (initially solid) binder fibers convert to a latex-like or viscous melt.

Preferably, the core polymer material of the binder fibers comprises, or consists of, polyethylene terephthalate (PET). The sheath polymer material preferably comprises, or consists of, a co-polyester of polyethylene terephthalate, 1,4-butanediol, polytetramethylene glycol and adipic acid.

Preferably, the binder fibers are staple fibers.

The amount of the binder fibers is preferably in the range of 10 to 90 wt.-% such as 50 to 90 wt.-%, preferably 60 to 80 wt.-%, more preferably 65 to 75 wt.-%, based on the total amount of fibers in the at least one fiber layer.

The binder fibers have an average fiber length in the range of 4 to 8 mm, preferably 5 to 7 mm. The average fiber length is determined using microscope analysis (microscope model; NIKON ECLIPSE ME600; magnification: 100×). The binder fibers have an average fiber diameter in the range of 10 to 23 μm, preferably 12 to 22 μm, as determined using microscope analysis (microscope model: NIKON ECLIPSE ME600; magnification: 100×).

Further, the binder fibers have a linear mass density in the range of 1 to 5 g/9000 m, preferably 1.5 to 4.5 g/9000 m, as measured by ASTM D 1577.

Properties of the Filter Medium

The filter medium according to the invention has excellent mechanical properties. Preferably, the filter medium has a basis weight of 120 to 250 g/m², preferably 130 to 180 g/m² (DI EN 29073-1 (nonwoven)). The air permeability at a differential pressure of 125 Pa is preferably at least 320 l/m²s or from 30 to 250 cfm, preferably, 30 to 200 cfm (DIN EN ISO 9237). Preferably, the filter medium according to the invention has a burst strength of greater than 4 bar, preferably greater than 5 bar, more preferably greater than 6 bar, most preferably greater than 7 bar (EN ISO 2758). Moreover, the filter medium may be pleated and preferably maintains its form without considerable deformation after 24-hour storage under an air temperature of 150° C. which additionally results in a shrinkage of 5% or less. The filter medium according to the invention preferably has an oil filtration efficiency against 20 μm sized particles of SOW or more, preferably 80% or more, more preferably 85% or more (ISO 4548-12). The filter medium according to the invention preferably has a stiffness of 1800 to 5500 mgs (ASTM 6125-97).

Surprisingly, the filter medium has improved heat resistance and filtration efficiency in comparison to prior art filter media having similar mechanical properties.

Process for the Preparation of the Filter Medium

The filter medium according to the invention is prepared by the following wet laying process:

In a first step, homogeneous slurries of the synthetic polymer fibers and binder fibers as defined above in water are prepared by adding and mixing of the fibers in water.

The synthetic polymer fibers and the binder fibers as defined above are referred to in the following as "fiber components".

In a second step, the homogeneous fiber components are subsequently mixed. The mixture is prepared using common mixing equipment. Optionally, the fiber components are simultaneously added and mixed.

Thereafter, the mixture of fiber components of step 2 is applied onto a dewatering screen. This screen can be any screen commonly used in a papermaking process. Preferably, the screen is a dewatering endless screen. Upon supplying (or coating) of the slurry, a deposit is formed on the screen. Supplying can be carried out using common prior art techniques.

During or after deposition of the slurry, water is removed to form a wet fibrous mat or sheet. Subsequently, the wet fibrous mat or sheet is dried while heating to a temperature which at least corresponds to the melting point of the binder fibers' sheath polymer material, but is lower than the melting point of the binder fibers' core polymer material. Preferably, drying is performed in a temperature range of 100° C. to 200° C., more preferably 120° C. to 180° C., most probably 145° C. to 175° C. In this way, binding (or "bonding") of the fibers is achieved by merely fusing the binder fibers' sheath polymer material which thereupon connects the binder fibers' core polymer material with the synthetic fibers.

During the drying process, the fiber layer may be preferably furnished with a suitable corrugation.

In some embodiments, an impregnation with a commonly known prior art binder resin is not carried out.

In an additional step, the thus obtained filter medium may be optionally wound into a roll.

Filter Element

According to the invention, a filter element is likewise prepared. Specifically, this filter element comprises a tubular supporting body, a pleated filter medium as defined above arranged at the supporting body and end caps arranged at the front sides of the filter medium, wherein the end caps are glued or heat-sealed with the filter medium. According to the invention, the filter medium, optionally in combination with a wire mesh as supporting carrier, is pleated in the filter element, thereby increasing the filtration surface. Specifically, the pleating (or "folding") is performed in stand-up pleats (also referred to as zigzag folds). Pleating processes are known in the prior art, for instance pleating may be carried out using a knife pleating machine and a rotary press.

Figure 2:
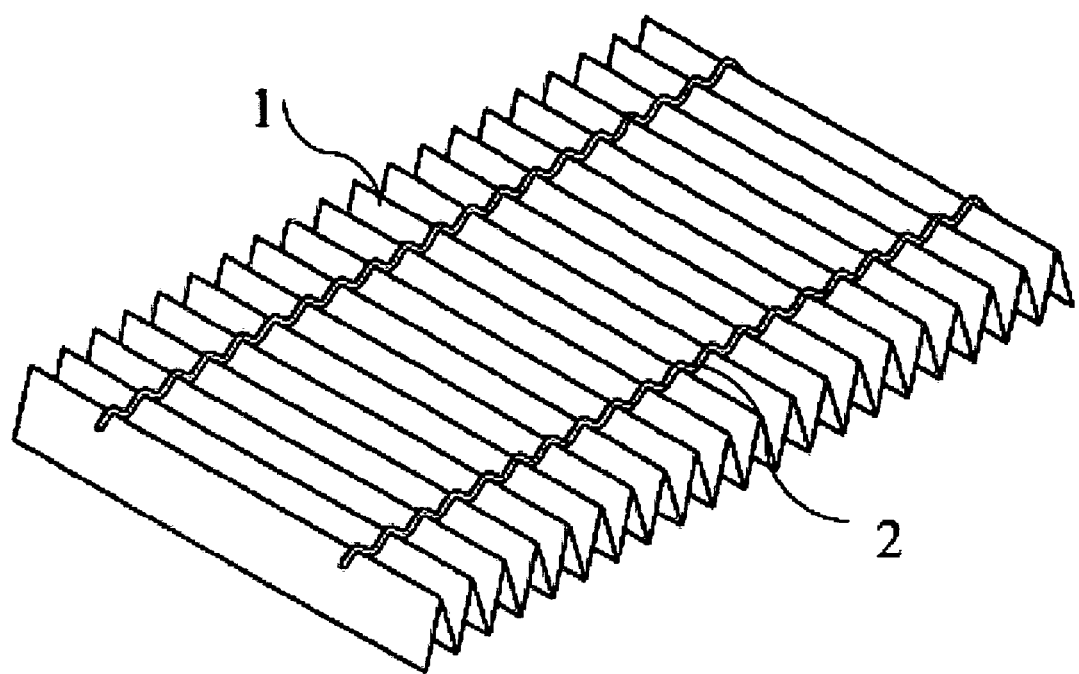
FIG. 2 shows a typical oil filter from the prior art (1: filter medium; 2: mesh as carrier).
Figure 3:
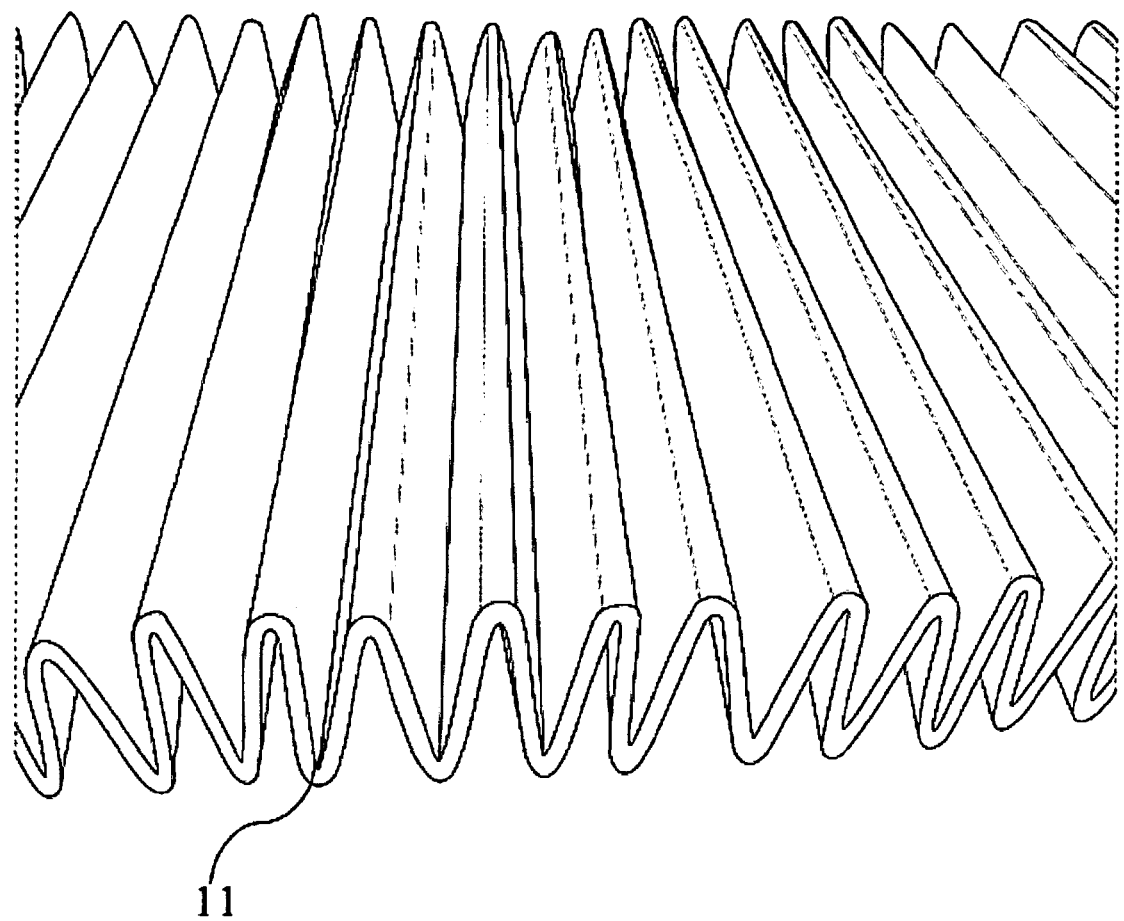
FIG. 3 shows an exemplary "self-supporting" filter medium according to the invention (11: pleated filter medium).

The filter medium according to the invention is characterised in that it may be easily pleated and is "self-supporting", i.e. it may be handled without a commonly used wire or wire mesh as support and basically maintains its pleated form after pleating, i.e. even under the temperature conditions prevailing in e.g. a combustion engine. A prior art filter medium supported by a wire is shown in FIG. 2. In one embodiment, a pleated filter medium may be provided with pleats having a sharp angle of less than 30°, preferably less than 25° (see also a schematic representation of a filter medium according to the invention in FIG. 3). This allows for a simpler handling of the filter medium and in particular less material expenses and a lightweight construction of the filter element, respectively.

Surprisingly, the filter medium according to the invention is even capable of retaining the pleats after oil contact, in particular hot oil having a temperature of at least up to 150° C. such as e.g. in a combustion engine.

Therefore, the filter element according to the invention is particularly suitable for filtration of hot liquids, such as oil in a combustion engine of an automobile.

In a preferred embodiment, the filter element of the invention is an oil filter for a combustion engine of an automobile.

Use of the Filter Medium and the Filter Element

According to the invention, the filter medium and the filter element are envisaged for use as an oil filter for an automobile's combustion engine. However, the filter medium and the filter element according to the invention may also be useful for other filtration applications.

Experimental Part

The following example serves to illustrate the present invention, but shall not be understood as limiting the protective scope in any way.

DSC Measurements

The DSC measurements were carried out on a PerkinElmer (Diamond DSC) device of the company Perkin Elmer under the following conditions: all of the DSC measurements were carried out in a temperature range from 30 to 300° C. at a heating rate of 10° C./min and a cooling rate of 10° C./min in a standard crucible (aluminum). The sample weight was 7.8 mg. The data analysis was carried out using the Pyris Series Software. Two heat runs and one intermediate cool run were carried out.

Example 1

A wet-laid unwoven nonwoven as a filter medium according to the invention was prepared by wet-laying of a homogenous slurry of 69.2 wt.-% binder fibers (co-polyester of polyethylene terephthalate, 1,4-butanediol, polytetramethylene glycol and adipic acid) and 30.8 wt.-% PET fibers (Denier: 0.3 g/9000 m; fiber length: 5 mm) on a dewatering screen and drying of the filter medium while heating, wherein the binder fibers have the following properties:

TABLE 1

| Property | Standard | |
|---|---|---|
| Melting point | DSC, 10° C./min | 164 ± 3.0° C. |
| Denier | ASTM D 1577 | 3.80 ± 0.35 g/9000 m |
| Strength | ASTM D 3822 | 4.5 ± 0.5 g/De |
| Elongation | ASTM D 3822 | 35 ± 7.0% |
| Fiber length | | 6.0 ± 1.0 mm |
| Heat shrinkage | (75° C. × 15 min) | 8.0 ± 2.0% |
| Oil pick up | KS K0327 | 0.30 ± 0.05% |
| Moisture content | | 12.0 ± 2.0% |

The filter medium has the following properties:

TABLE 2

| Property | Standard | |
|---|---|---|
| Basis weight | DIN EN 29073-1 (nonwoven) | 163 g/m² |
| Thickness | DIN EN ISO 9073-2 (nonwoven), 20 kPa | 1.03 mm |

TABLE 2-continued

| Property | Standard | |
|---|---|---|
| Air permeability | Differential pressure: 125 Pa | 126 cfm/sq.ft |
| Stiffness | ASTM D6125-97 | 2300 mgs |
| Pore size | ASTM 316-03, Bubble test MHN 610 110 | 102 μm (max.) 89 μm (min.) |

The burst strength of the resulting filter medium was measured after storage according to Mullen (in fresh oil Castrol 0W30 at a temperature of 150° C. after 500 hours) (in accordance with DIN EN ISO 2758, MHN 610 110). The mean and maximum pore size was measured according to ASTM 316-03 (Bubble test). The shrinkage of the resulting filter medium in machine direction (MD) and cross-machine direction (CD) was measured after storage at an air temperature of 150° C. after 24 hours (in accordance with MHN 610 110). The filtration efficiency was measured in accordance with ISO 4548-12. The results of the measurements are given in Table 3:

TABLE 3

| Test | Standard | Result |
|---|---|---|
| Burst strength | DIN EN ISO 2758 MHN 610 110 | >7 bar |
| Shrinkage (MD) | MHN 610 110 | 0.96% |
| Shrinkage (CD) | MHN 610 110 | −0.75% |
| Filtering efficiency | ISO 4548-12 | 18 μm: 50% |
| | | 24 μm: 75% |
| | | 30 μm: 90% |
| | | 40 μm: 98.7% |
| | | 43 μm: 99.0% |

Examples 2 to 4

Wet-laid nonwovens as exemplary filter media according to the invention were prepared in accordance with example 1 and the data given below in Table 4. The properties of the obtained filter media is shown in Table 5.

TABLE 4

| | Example 1 | Example 2 | Example 3 | Example 4 |
|---|---|---|---|---|
| % Fibers in Media | 100.0% | 78.0% | 89.2% | 89.2% |
| Binder fibers (4D * 6 mm) | 69.2% | 60.0% | 19.7% | 33.4% |
| PET fibers (0.06 dt * 3 mm) | | | 14.8% | 10.8% |
| PET fibers (0.3 dt * 5 mm) | 30.8% | 40.0% | 65.5% | 35.6% |
| Glass fiber (C04F) | | | | 10.1% |
| Glass fiber (C26R) | | | | 10.1% |
| Thermoset acrylic resin | 0.0% | 22.0% | 10.8% | 10.8% |
| Basis weight web/no resin | 163 | 132 | 119 | 120 |

TABLE 5

| | | | Example 1 | Example 2 | Example 3 | Example 4 |
|---|---|---|---|---|---|---|
| Mass per unit area | g/m² | SD | 168 | 169 | 133 | 134 |
| | | SDC | 162 | 166 | 130 | 131 |
| Thickness | mm | Caliper of Flat Sheet | 1.03 | 0.94 | 0.832 | 0.78 |
| Air permeability | cfm/sf | — | 126 | 94 | 51 | 30 |
| Burst Strength | kgf/cm² | SD | >7 | 7.26 | 5.0 | 4.63 |
| Stiffness | mg | SD | 2300 | 5156 | 2090 | 3734 |
| Pore Size | μm | Max | 102 | 81 | 51 | 43 |
| | | Mean | 89 | 71 | 47 | 36 |
| Shrinkage | % | MD | 0.96 | 0.79 | | |
| | | CD | −0.75 | 0.08 | | |
| Efficiency (Oil) ISO 4548-12 | % | Sheet | >50%@20 μm | >50%@20 μm | >99%@20 μm | >90%@20 μm |

Results

These results demonstrate that an excellent burst strength up to more than 7 bar may be achieved with the filter media according to the invention after 500 hours at 150° C. Therefore, the filter media according to the invention have an excellent heat resistance at 150° C. It can be further seen the burst strength of the inventive filter media is associated with the mean and maximum pore size of the filter media (see e.g. examples 3 and 4 vs. example 2). Further, the filter media according to the invention is utmost dimensionally stable and exhibits a very low shrinkage (both MD and CD) even after a 24-hour storage at 150° C. Moreover, the resulting filter media have a high filtering efficiency which considerably goes beyond the usual filtering efficiency of e.g. oil filters in this efficiency class. This is presumably due in part to the fact that the filter medium according to the invention foregoes without common impregnation with a binder resin (example 1). This is because common binder resins tend to melt at 150° C. and to clog the pores of the filter, thereby decreasing the filtering performance and in particular the dust holding capacity. However, even with binder resins a relatively high filtering efficiency can be obtained (see examples 2 to 4).

Overall, the filter medium according to the invention likewise allows for an improved filtering efficiency with a simultaneously improved heat resistant at least up to 150° C. The filter medium according to the invention is therefore extremely suitable as an oil filter in combustion engines of automobiles, wherein temperatures are from 100° C. to 150° C.

The invention claimed is:
1. A filter medium comprising at least one wet-laid fiber layer, wherein the at least one wet-laid fiber layer comprises:
   (i) synthetic polymer fibers having a melting point of greater than 155° C.; and
   (ii) binder fibers having a core-sheath structure, wherein a core polymer material constituting the core of the binder fibers is at least partially surrounded by a sheath polymer material constituting the sheath of the binder fibers;
wherein both the core polymer material and the sheath polymer material have a melting point of greater than 155° C.; and
wherein the melting point of the sheath polymer material is in the range of 155° C. to 180° C.

2. The filter medium according to claim 1, wherein the synthetic polymer fibers comprise polymer materials selected from polyesters (such as polyalkylene terephthalates like polyethylene terephthalate (PET), polybutylene terephthalate (PBT), etc.); polyalkylenes (such as polyethylene polypropylene, etc.); polyacrylonitriles (PAN); polyamides (nylon such as nylon-6, nylon-6.6, nylon-6.12, etc.); or mixtures thereof.

3. The filter medium according to claim 1, wherein the synthetic polymer fibers comprise polyethylene terephthalate.

4. The filter medium according to claim 1, wherein the mean pore size of the at least one wet-laid fiber layer is in the range of 20 μm to 200 μm as measured according to ASTM 316-03.

5. The filter medium according to claim 1, wherein the core polymer material comprises polyethylene terephthalate and the sheath polymer material comprises a co-polyester of polyethylene terephthalate, 1,4-butanediol, polytetramethylene glycol and adipic acid.

6. The filter medium according to claim 1, wherein the core polymer material has a melting point greater than 200° C.

7. The filter medium according to claim 1, wherein the sheath polymer material is characterized by having a degree of crystallization in the range of 20% to 80%, as determined by X-ray diffraction.

8. The filter medium according to claim 1, wherein the onset temperature Tm Onset of the melting of the sheath polymer material is at least 130° C., as determined using DSC.

9. The filter medium according to claim 1, wherein the end temperature Tm end of the melting of the sheath polymer material is at least 160° C., as determined using DSC.

10. The filter medium according to claim 1, wherein the difference between the onset temperature of the melting Tm onset and the end temperature of the melting Tm end of the sheath polymer material is at least 30° C., as determined using DSC.

11. The filter medium according to claim 1, wherein the sheath of the binder fibers is not completely amorphous.

12. The filter medium according to claim 1, wherein the synthetic fibers and the binder fibers are staple fibers.

13. The filter medium according to claim 1, wherein
   (i) the amount of the synthetic polymer fibers is in the range of 10 to 90 wt.-%, based on the total amount of fibers in the at least one fiber layer; or
   (ii) the amount of binder fibers is in the range of 10 to 90 wt.-%, based on the total amount of fibers in the at least one fiber layer.

14. The filter medium according to claim 1, wherein
   (i) the synthetic polymer fibers have an average fiber length in the range of 3 to 15 mm or a linear mass density in the range of 0.1 to 1.0 g/9000 m, as measured by ASTM D 1577; or
   (ii) the binder fibers have an average fiber length in the range of 4 to 8 mm or a linear mass density in the range of 1 to 5 g/9000 m, as measured by ASTM D 1577.

15. The filter medium according to claim 1, wherein
   (i) the synthetic polymer fibers have an average fiber diameter in the range of 3.3 to 10 μm, as measured by microscope analysis; or
   (ii) the binder fibers have an average fiber diameter in the range of 10 to 23 μm, as measured by microscope analysis.

16. The filter medium according to claim 1 which is obtainable by wet laying a mixture of the synthetic polymer fibers and the binder fibers and heating the wet-laid mixture to a temperature of at least the melting temperature of the sheath polymer material but lower than the melting temperature of the core polymer material.

17. The filter medium according to claim 1, which is characterized by a basis weight in the range of 120 to 250 g/m$^2$, as measured by DIN EN 29073-1 (nonwoven).

18. The filter medium according to claim 1, which is characterized by an air permeability of at least 320 l/m$^2$s, as measured by DIN EN ISO 9237.

19. The filter medium according to claim 1, which is characterized by a heat shrinkage of 5% or less after a 24 hour storage under an air temperature of 150° C.

20. The filter medium according to claim 1, which is characterized by an oil filtration efficiency against 20 μm sized particles of 50% or more, as measured by ISO 4548-12.

21. The filter medium according to claim 1, which is characterized by a stiffness of 1800 to 5500 mgs as determined by ASTM 6125-97.

22. The filter medium according to claim 1, wherein the maximum pore size of the at least one wet-laid fiber layer is in the range of 20 μm to 200 μm, as measured according to ASTM 316-03.

23. A filter element comprising the filter medium according to claim 1.

24. The filter element according to claim 23, wherein the filter medium is pleated and optionally comprises a wire mesh as supporting layer co-pleated with the filter medium.

25. The filter element according to claim 23, which is an oil filter for a combustion engine.

26. A filter medium comprising at least one wet-laid fiber layer, wherein the at least one wet-laid fiber layer comprises:
   (i) synthetic polymer fibers having a melting point of greater than 155° C.; and
   (ii) binder fibers having a core-sheath structure, wherein a core polymer material constituting the core of the binder fibers is at least partially surrounded by a sheath polymer material constituting the sheath of the binder fibers;
wherein both the core polymer material and the sheath polymer material have a melting point of greater than 155° C.; and
wherein the melting point of the sheath polymer material is in the range of 155° C. to 180° C.,
which is characterized by a burst strength of greater than 4 bar, as measured by EN ISO 2758.

27. A process for preparing the filter medium comprising at least one wet-laid fiber layer, wherein the at least one wet-laid fiber layer comprises:
   (i) synthetic polymer fibers having a melting point of greater than 155° C.; and
   (ii) binder fibers having a core-sheath structure, wherein a core polymer material constituting the core of the binder fibers is at least partially surrounded by a sheath polymer material constituting the sheath of the binder fibers;

wherein both the core polymer material and the sheath polymer material have a melting point of greater than 155° C.; and wherein the melting point of the sheath polymer material is in the range of 155° C. to 180° C., the process comprising the steps of
   providing a homogeneous slurry of the synthetic fibers and the binder fibers in water;
   supplying the slurry onto a dewatering screen to form a deposit;
   removing the water from the deposit to form a wet fibrous mat or sheet;
   drying the wet fibrous mat or sheet while heating to a temperature which at least corresponds to the melting point of the binder fibers' sheath polymer material, but is lower than the melting point of the binder fibers' core polymer material to form a substrate.

28. The process according to claim 27, wherein the drying is performed in a temperature range of 100° C. to 200° C.

* * * * *